United States Patent Office
3,801,543
Patented Apr. 2, 1974

3,801,543
HINDERED PHENOLIC PHOSPHORODITHIOATE
ANTIOXIDANTS FOR SBR POLYMERS
Bernard R. Meltsner, Royal Oak, Mich., assignor to
Ethyl Corporation, Richmond, Va.
No Drawing. Application Oct. 29, 1968, Ser. No. 771,656,
now Patent No. 3,662,033, which is a continuation-in-
part of abandoned application Ser. No. 707,428, Feb.
23, 1968. Divided and this application Jan. 20, 1972,
Ser. No. 219,509
Int. Cl. C08d 7/10
U.S. Cl. 260—45.95 C                                7 Claims

ABSTRACT OF THE DISCLOSURE

Styrene-butadiene rubber is stabilized by addition of a compound having the formula:

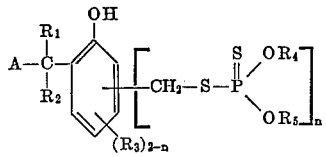

wherein A is an aryl radical containing from 6–18 carbon atoms, $R_1$ is a lower alkyl radical containing from 1–3 carbon atoms, $R_2$ is selected from hydrogen and lower alkyl radicals containing from 1–3 carbon atoms, $R_3$ is selected from the group consisting of alkyl radicals containing from 1–20 carbon atoms, cycloalkyl radicals containing from 6–20 carbon atoms and radicals having the formula:

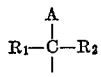

wherein A, $R_1$ and $R_2$ are the same as above; $R_4$ and $R_5$ are independently selected from the group consisting of alkyl radicals containing from 1–50 carbon atoms and aryl radicals containing from 6–20 carbon atoms, and $n$ is 1 or 2. An example is S-[3,5-di-(α-methylbenzyl)-4-hydroxybenzyl]-O,O-di-($C_{20-50}$ primary alkyl) phosphorodithioate. A process of making the compounds by the reaction of 3,5-di-hydrocarbyl-4-hydroxybenzyl halide with an O,O-di-hydrocarbyl dithiophosphoric acid in the presence of an alkali metal base or an alkaline earth metal base is also disclosed.

This application is a division of application Ser. No. 771,656, filed Oct. 29, 1968, now U.S. 3,662,033, which in turn is a continuation-in-part of application Ser. No. 707,428, filed Feb. 23, 1968, now abandoned.

BACKGROUND

Styrene-butadiene copolymer (SBR rubber) is a synthetic rubber used extensively in the manufacture of tires. In this use, it is compounded with a variety of other agents such as carbon black or oil extending agents, accelerators, sulfur, and other kinds of rubber such as natural rubber or synthetic rubbers; for example, poly-cis-butadiene. Rubber antioxidants such as phenyl-β-naphthyl amine (PBNA) are added to the final compounded rubber to protect it from deterioration during the use period following vulcanization. The finally compounded rubber is built into its desired form together with reinforcing materials when required such as rayon, nylon, polyester or glass fabric. The finished article is then heated to vulcanization temperature whereby the sulfur reacts with the rubber, forming cross-links, until the desired degree of cure is obtained. This vulcanized product can be protected against oxidative degradation by a wide variety of well-known antioxidants. However, there is a critical period during the time from initial manufacture of the copolymer and final compounding and vulcanization that requires special attention. The unvulcanized raw SBR copolymer is especially prone to degradation during this period. This degradation is caused by rupture of the copolymer chains referred to as "chain scission" and also by undesired cross-linking of the copolymers. When this deterioration takes place to a substantial extent during storage while awaiting compounding and vulcanization it becomes impossible to properly formulate and produce a satisfactory vulcanized product. One accepted measure of the degree of deterioration of the unvulcanized raw copolymer during storage is the change in its Mooney viscosity. Decrease in Mooney viscosity indicates chain scission and an increase indicates cross-linking.

Many of the common rubber antioxidants which provide good protection of fully compounded vulcanized SBR rubber do not provide adequate protection for unvulcanized raw copolymer during storage. Not only that, but some additives that effectively stabilize other unvulcanized synthetic rubbers fail to provide adequate protection for styrene-butadiene rubber. A further object is to present invention provides stabilizers for SBR rubber that are exceptionally useful in stabilizing unvulcanized SBR rubber and make possible a product which does not exhibit any substantial change in Mooney viscosity during an extended storage period. This stabilization appears to be specific for unvulcanized styrene-butadiene rubber because the additives provide but little protection for other unvulcanized synthetic rubbers.

DESCRIPTION OF THE PREFERRED
EMBODIMENTS

An object of this invention is to provide a stabilizer for styrene-butadiene rubber. A further object is to provide additives for unvulcanized SBR rubber which inhibit chain scission and cross-linking during storage and prevent a resultant change in Mooney viscosity. These and other objects are accomplished by providing a styrene-butadiene stabilizer having the formula:

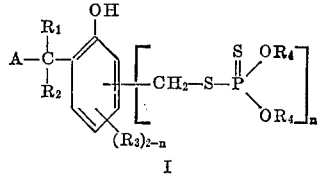

I wherein A is an aryl radical containing from 6–18 carbon atoms, $R_1$ is a lower alkyl radical containing from 1–3 carbon atoms, $R_2$ is selected from hydrogen and lower alkyl radicals containing from 1–3 carbon atoms, $R_3$ is selected from the group consisting of alkyl radicals containing from 1–20 carbon atoms, cycloalkyl radicals containing from 6–20 carbon atoms and radicals having the formula:

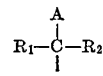

wherein A, $R_1$ and $R_2$ are the same as above, $R_4$ and $R_5$ are independently selected from the group consisting of alkyl radicals containing from 1–50 carbon atoms and aryl radicals containing from 6–20 carbon atoms, and $n$ is 1 or 2.

Some examples of these new stabilizers when $n$ is 1 are:

S-[3,5-di(α,α-dimethylbenzyl)-2-hydroxybenzyl]-O,O-
  di-methyl phosphorodithioate
S-[3,5-di(α-methylbenzyl)-2-hydroxybenzyl]-O,O-
  diisobutyl phosphorodithioate S-[3-(α-n-propylbenzyl)-5-tert-butyl-2-hydroxybenzyl]-O,O-di(2-ethylhexyl) phosphorodithioate
S-[3-(α,α-di-n-propylbenzyl)-5-methyl-2-hydroxybenzyl]-O,O-dioctadecyl phosphorodithioate
S-[3-(α-methyl-p-dodecylbenzyl)-p-sec-dodecyl-2-hydroxybenzyl]-O,O-di-triacontyl phosphorodithioate
S-[3-(α-methyl-2,3-benzobenzyl)-5-sec-eicosyl-2-hydroxybenzyl]-O,O-di-pentacontyl phosphorodithioate
S-[3-(α,α-dimethylbenzyl)-5-cyclohexyl-2-hydroxybenzyl]-O,O-diphenyl phosphorodithioate
S-[3-(α-methylbenzyl)-5-(4-tetradecylcyclohexyl)-2-hydroxybenzyl]-O,O-di(p-nonylphenyl) phosphorodithioate
S-[3,5-di(α-methyl-3,5-di-tert-butylbenzyl)-2-hydroxybenzyl]-O,O-di(p-sec-dodecylphenyl) phosphorodithioate
S-[3,5-di(α-methylbenzyl)-2-hydroxybenzyl]-O,O-di-(p-sec-tetradecylphenyl) phosphorodithioate
S-[3(α-methylbenzyl)-5-methyl-4-hydroxybenzyl]-O,O-dimethyl phosphorodithioate
S-[3(α,α-di-n-propylbenzyl)-5-cyclohexyl-4-hydroxybenzyl]-O,O-didodecyl phosphorodithioate
S-[3(α,α-dimethylbenzyl)-5-(4-sec-tetradecylcyclohexyl)-4-hydroxybenzyl]-O,O-dieicosyl phosphorodithioate
S-[3,5-di(α-n-propylbenzyl)-4-hydroxybenzyl]-O,O-di-triacontyl phosphorodithioate
S-[3(α,α-dimethyl-2,3-benzobenzyl)-5-sec-eicosyl-4-hydrozybenzyl]-O,O-di-pentacontyl phosphorodithioate
S-[3(α-methylbenzyl)-5-cyclooctyl-4-hydroxybenzyl]-O,O-diphenyl phosphorodithioate
S-[3(α-methylbenzyl)-5-(α,α-dimethylbenzyl)-4-hydroxybenzyl]-O,O-di(p-dodecylphenyl) phosphorodithioate.

When $n$ is 2, the compounds have the formula:

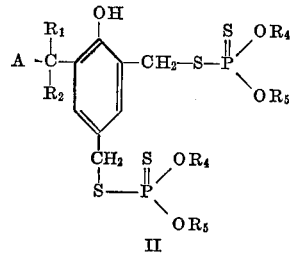

II

Some examples of these compounds are:

O,O-dimethyl phosphorodithioate, S,S-diester with $α^2,α^4$-dimercapto-6-(α,α-dimethylbenzyl)-2,4-xylenol
O,O-dieicosyl phosphorodithioate, S,S-diester with $α^2,α^4$-dimercapto-6-(α-methylbenzyl)-2,4-xylenol
O,O-di-triacontyl phosphorodithioate, S,S-diester with $α^2,α^4$-dimercapto-6-(α-n-propylbenzyl)-2,4-xylenol
O,O-di-pentacontyl phosphorodithioate, S,S-diester with $α^2,α^4$-dimercapto-6-(α-methylbenzyl)-2,4-xylenol
O,O-diphenyl phosphorodithioate, S,S-diester with $α^2,α^4$-dimercapto-6-(α-methyl-4-sec-dodecylbenzyl)-2,4-xylenol
O,O-di(p-tetradecylphenyl)phosphorodithioate, S,S-diester with $α^2,α^4$-dimercapto-6-(α,α-dimethyl-1,3-benzobenzyl)-2,4-xylenol
O,O-dinaphthyl phosphorodithioate, S,S-diester with $α^2,α^4$-dimercapto-6-(α-methylbenzyl)-2,4-xylenol.

Of the foregoing, the preferred stabilizers are those of Formula I having the configuration:

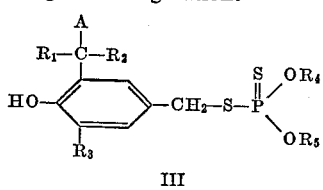

III in which A, $R_1$, $R_2$, $R_3$, $R_4$ and $R_5$ are the same as defined for Formula I.

These compounds are highly preferred because in addition to providing excellent stabilization against change in Mooney viscosity during the period prior to vulcanization they also provide a rubber stock which will not discolor due to the effects of ultraviolet light.

Some examples of this highly preferred group of compounds are:

S-[3-methyl-5-(α,α-dimethylbenzyl)-4-hydroxybenzyl]-O,O-dimethyl phosphorodithioate
S-(3-cyclooctyl-5-isopropyl-4-hydroxybenzyl)-O,O-di-isobutyl phosphorodithioate
S-[3-(α-n-propyl-2,3-benzobenzyl)-5-methyl-4-hydroxybenzyl]-O,O-di(2-ethylhexyl)phosphorodithioate
S-[3-(α,α-dimethylbenzyl)-5-sec-butyl-4-hydroxybenzyl]-O,O-di-n-triacontyl phosphorodithioate
S-[3-methyl-5-(α,α-dimethylbenzyl)-4-hydroxybenzyl]-O,O-di-n-dodecyl phosphorodithioate
S-[3-tert-butyl-5-(α-methylbenzyl)-4-hydroxybenzyl]-O,O-di-sec-eicosyl phosphorodithioate
S-[3,5-di(α,α-dimethylbenzyl)-4-hydroxybenzyl]-O,O-diphenyl phosphorodithioate
S-[3-cyclohexyl-5-(α-n-propylbenzyl)-4-hydroxybenzyl]-O,O-di(3,5-di-sec-heptylphenyl) phosphorodithioate
S-[3-tert-eicosyl-5-(α-methyl-3,5-di-sec-hexylbenzyl)-4-hydroxybenzyl]-O,O-dipentacontyl phosphorodithioate
S-[3-(1-methylcyclohexyl)-5-(α,α-dimethyl-4-tert-butylbenzyl)-4-hydroxybenzyl]-O,O-p-nonylphenyl phosphorodithioate
S-[3-(3,5-di-sec-heptylcyclohexyl)-5-(α-methylbenzyl)-4-hydroxybenzyl]-O,O-didocosyl phosphorodithioate.

Of the foregoing, the most highly preferred are those in which two aralykyl radicals are bonded to the phenolic benzene ring ortho to the hydroxyl radical as shown in the following formula:

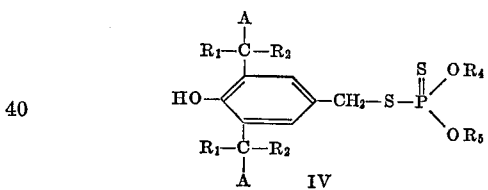

IV in which A, $R_1$, $R_2$, $R_4$ and $R_5$ are the same as defined for Formula I. Examples of these compounds are:

S-[3-(α-methylbenzyl)-5-(α,α-dimethylbenzyl(-4-hydroxybenzyl]-O,O-diphenyl phosphorodithioate
S-[3,5-di(α-methylbenzyl)-4-hydroxybenzyl]-O,O-di-p-nonylphenyl phosphorodithioate
S-[3-(α-methylbenzyl)-5-(α,α-di-n-propylbenzyl)-4-hydroxybenzyl]-O,O-di(p-sec-tetradecylphenyl)-phosphorodithioate
S-[3,5-di(α-methylbenzyl)-4-hydroxybenzyl]-O,O-dimethyl phosphorodithioate
S-[3,5-di(α-methylbenzyl)-4-hydroxybenzyl]-O,O-di-(α-naphthyl) phosphorodithioate
S-[3,5-di(α-methyl-2,3-benzobenzyl)-4-hydroxybenzyl]-O,O-dipentacontyl phosphorodithioate
S-[3,5-di(α-methyl-4-sec-dodecylbenzyl)-4-hydroxybenzyl]-O,O-di-sec-triacontyl phosphorodithioate.

Of compounds having Formula IV, the most preferred are those in which both aralkyl radicals are α-methylbenzyl radicals. These compounds have the formula:

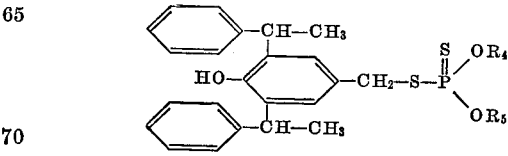

V wherein $R_4$ and $R_5$ are the same as in Formula I. Examples of these are:

S-[3,5-di(α-methylbenzyl)-4-hydroxybenzyl]-O,O-dimethyl

S-[3,5-di(α-methylbenzyl)-4-hydroxybenzyl]-O,O-di-
pentacontyl
S-[3,5-di(α-methylbenzyl)-4-hydroxybenzyl]-O,O-dido-
decyl
S-[3,5-di(α-methylbenzyl)-4-hydroxybenzyl]-O,O-di-
eicosyl
S-[3,5-di(α-methylbenzyl)-4-hydroxybenzyl]-O,O-di-
phenyl
S-[3,5-di(α-methylbenzyl)-4-hydroxybenzyl]-O,O-di-
(p-nonylphenyl)
S-[3,5-di(α-methylbenzyl)-4-hydroxybenzyl]-O,O-di-
(p-tetradecylphenyl)
S-[3,5-di(α-methylbenzyl)-4-hydroxybenzyl]-O,O-di-
isobutyl phosphorodithioate
S-[3,5-di(α-methylbenzyl)-4-hydroxybenzyl]-O,O-di-
(2-ethylhexyl) phosphorodithioate
S-[3,5-di(α-methylbenzyl)-4-hydroxybenzyl]-O,O-di-
hexadecyl phosphorodithioate
S-[3,5-di(α-methylbenzyl)-4-hydroxybenzyl]-O,O-di-
octadecyl phosphorodithioate
S-[3,5-di(α-methylbenzyl)-4-hydroxybenzyl]-O,O-di-
docosyl phosphorodithioate
S-[3,5-di(α-methylbenzyl)-4-hydroxybenzyl]-O,O-di-
tetracosyl phosphorodithioate
S-[3,5-di(α-methylbenzyl)-4-hydroxybenzyl]-O,O-di-
hexacosyl phosphorodithioate
S-[3,5-di(α-methylbenzyl)-4-hydroxybenzyl]-O,O-di-
octacosyl phosphorodithioate.

Because of the unusually high degree of stability against Mooney change and concurrent non-discoloration from U.V. light provided to unvulcanized styrene-butadiene rubber, a most preferred stabilizer is that having the formula:

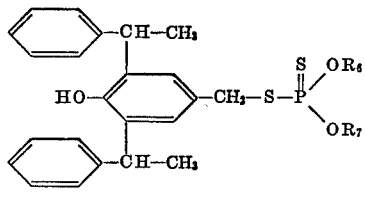

VI wherein $R_6$ and $R_7$ are primary aliphatic hydrocarbon radicals containing from about 20 to about 50 carbon atoms. Extremely good results are obtained when $R_6$ and $R_7$ are primary aliphatic hydrocarbon radicals containing from about 20 to about 50 carbon atoms in the proportion of about 14–29 weight percent primary aliphatic radicals containing 20 carbon atoms, about 14–29 weight percent primary aliphatic radicals containing 22 carbon atoms, about 7–21 weight percent primary aliphatic radicals containing 24 carbon atoms, about 7–21 weight percent primary aliphatic radicals containing 26 carbon atoms, about 7–21 weight percent primary aliphatic radicals containing 28 carbon atoms and about 7–21 weight percent primary aliphatic radicals of even carbon number containing from 30–50 carbon atoms.

An excellent process for making the compounds of this invention is to first react the appropriate alcohol or aromatic hydroxy compound with phosphorus pentasulfide to form the corresponding dihydrocarbyl dithiophosphoric acid and then to react this with the appropriate benzyl halide. This process is illustrated by the following equations:

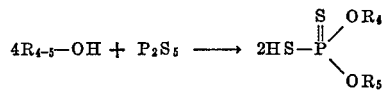

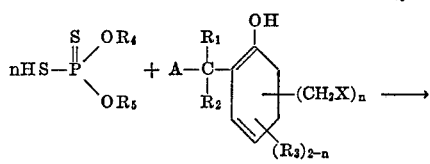

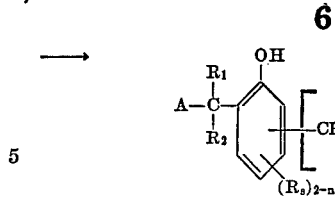

wherein $R_1$, $R_2$, $R_3$, $R_4$, $R_5$, A and $n$ are the same as defined for Formula I and X is a halogen having an atomic number from 17 through 53, namely, chlorine, bromine or iodine.

The first reaction is carried out by mixing the phosphorus pentasulfide with the alcohol or aromatic hydroxy compound and heating the mixture to reaction temperature while stirring. Means for conducting this reaction are shown in U.S. 2,386,207; U.S. 3,190,833 and U.S. 3,293,181.

The temperature for the first part of the process should be high enough to promote a reasonable reaction rate, but not so high as to cause reactant or product decomposition. A useful temperature range is from 50° to 200° C. A preferred temperature range is from 75° to 150° C.

The stoichiometry of the reaction requires four equivalents of alcohol or aromatic hydroxy compound for each mole of phosphorus pentasulfide. Generally an excess of phosphorus pentasulfide is employed and the unreacted material filtered off after the reaction. A useful range is from 3 to 4 equivalents of alcohol or aromatic hydroxy compound per mole of phosphorus pentasulfide, and a more preferred range is from 3.5 to 4 equivalents of alcohol or aromatic hydroxy compound per mole of phosphorus pentasulfide.

Suitable alcohols or aromatic hydroxy compounds are any that are capable of reacting with phosphorus pentasulfide to form O,O-dihydrocarbyl dithiophosphoric acid. The preferred are aliphatic monohydric alcohols containing 1–50 carbon atoms or phenols containing 6–20 carbon atoms. Examples of these are methanol, isobutyl alcohol, dodecyl alcohol, octadecyl alcohol, eicosyl alcohol, triacontyl alcohol, tetracontyl alcohol, pentacontyl alcohol, cyclohexyl alcohol, 1-methylcyclohexyl alcohol, cyclooctyl alcohol, 4-tetradecylcyclohexyl alcohol, or mixtures of such alcohols. Phenols that can be employed include phenol, o-cresol, m-cresol, p-nonylphenol, p-dodecylphenol, p-tetradecylphenol, α-naphthol, 4-n-decyl-α-naphthol, or mixtures of the foregoing. Likewise, mixtures of the alcohols and aromatic hydrocarbons can also be employed with good results.

The preferred O,O-dihydrocarbyl dithiophosphoric acid intermediates are made by reacting phosphorus pentasulfide with a mixture consisting essentially of primary aliphatic alcohols containing from about 20–50 carbon atoms. Minor amounts, up to about 3 weight percent, may be present. These alcohols lead to products that are very inexpensive, fully compatible with unvulcanized styrene-butadiene rubber, and which impart excellent stability of such rubber against change in Mooney viscosity. The preferred proportion of primary aliphatic alcohols in the mixture is as follows:

| | Weight percent |
|---|---|
| Primary aliphatic $C_{20}$ alcohol | 14–29 |
| Primary aliphatic $C_{22}$ alcohol | 14–29 |
| Primary aliphatic $C_{24}$ alcohol | 7–21 |
| Primary aliphatic $C_{26}$ alcohol | 7–21 |
| Primary aliphatic $C_{28}$ alcohol | 7–21 |
| Primary aliphatic $C_{30-50}$ alcohols of even carbon number | 7–21 |

These alcohols are substantially all primary and are mixtures of normal and branched-chain aliphatic alcohols. They are readily available from a Ziegler type chain growth process. In this process, ethylene is reacted with triethyl aluminum under pressure until the alkyl groups attached to aluminum reach the desired chain length. The aluminum alkyl is then subjected to a controlled oxidation, yielding a mixture of alcohols. These may be distilled to remove the lower alcohols containing up to about 18 carbon atoms, leaving the preferred mixture of primary aliphatic alcohols containing from about 20–50 carbon atoms.

Alcohol mixtures obtained in this manner also contain up to about 30 weight percent paraffinic hydrocarbons. An unexpected feature of the new stabilizers is that they can be made from the $C_{20-50}$ primary aliphatic alcohol mixtures containing about 30 weight percent $C_{20-50}$ paraffins and the product has the same effectiveness on a weight basis with the paraffins left in as a similar product made from lower alcohols has even without the paraffin diluent. This is even more surprising when one considers that on the same weight basis there is not only less active ingredients, but also that on a mole basis there is substantially less stabilizer due to the higher molecular weight of the preferred products.

The O,O-dihydrocarbyl dithiophosphoric acids prepared as a first step in the process are also called O,O-dihydrocarbon esters of phosphorothiolothionic acid. To prepare the stabilizers the appropriate hydroxybenzyl halide is mixed with the O,O-diester of dithiophosphoric acid. The appropriate hydroxybenzyl halide can be made by reacting a phenol with formaldehyde and hydrogen halide as shown in U.S. 3,257,321.

The reaction is carried out by mixing approximately equivalent amounts of the hydroxybenzyl halide and O,O-diester of dithiophosphoric acid. The reaction is generally carried out in a solvent such as hexane, octane, benzene, toluene, xylene, chlorobenzene, dichlorobenzene, chloroform, carbon tetrachloride, trichloroethylene, diethyl ether, diethyleneglycol dimethyl ether, dioxane, and the like. The solvent should be substantially inert to the reactants. In a highly preferred modification of the process the O,O-dihydrocarbyl ester of dithiophosphoric acid is mixed with an alkali metal base or alkaline earth metal base such as sodium carbonate, sodium bicarbonate, sodium hydroxide, potassium carbonate, potassium bicarbonate, potassium hydroxide, calcium hydroxide, calcium oxide, magnesium oxide, magnesium hydroxide, barium hydroxide, and the like. The amount of base should be about equal on an equivalent basis to the amount of O,O-dihydrocarbyl ester of dithiophosphoric acid which is present. The manner in which the base accelerates the reaction rate is not clearly understood since they would not normally be reactive without adding water. At any rate, this improvement leads to a high conversion of the reactants to the desired product in a much shorter time than heretofore known.

The reaction can be carried out at temperatures of from about 0–200° C. Good results are obtained when the reaction is conducted at about 50–150° C. In the highly preferred modification, in which an alkali metal base is added to the reaction, it has been found that the reaction proceeds rapidly at temperatures as low as 20–50° C., and thus facilitates chemical processing.

A suitable method of recovering the product is to water wash the reaction product to remove any hydrogen halide, alkali metal halide, alkaline earth metal halide, or other watersoluble material that may be present, and then to distill off the solvent and remaining volatiles under vacuum, leaving the product generally in the form of a wax-like material.

The following examples serve to illustrate the methods of conducting the process of this invention to produce the preferred stabilizers.

EXAMPLE 1

Step A.—In a reaction vessel fitted with stirrer, thermometer, reflux condenser and gas inlet tube was placed 163 parts of a mixture of 81 weight percent 2,6-di($\alpha$-methylbenzyl)phenol, 12.2 weight percent 2,4,6-tri($\alpha$-methylbenzyl)phenol, and 4.8 weight percent 2-($\alpha$-methylbenzyl)phenol made by the process shown in U.S. 2,831,898. Following this, 250 parts of concentrated aqueous hydrochloric acid and 60 parts of paraformaldehyde were added. The mixture was heated to 60° C. while stirring, and dry hydrogen chloride was injected into the liquid phase while stirring at this temperature until a vapor phase chromatograph of the reaction mixture showed that all of the 2,6-di($\alpha$-methylbenzyl)phenol and 2-($\alpha$-methylbenzyl)phenol had reacted. Following this, the mixture was cooled to room temperature and the aqueous acid phase removed. Then 280 parts of toluene were added and the solution washed three times with water. Toluene was distilled from the mixture under vacuum until no further water came over with the toluene. This left 290 parts of a toluene solution containing 186.5 parts of a mixture of 3,5-di($\alpha$-methylbenzyl)-4-hydroxybenzyl chloride, 2-($\alpha$-methylbenzyl)-3,5-di-chloromethylphenol and 2,4,6- tri($\alpha$-methylbenzyl)phenol.

Step B.—In a second reaction vessel equipped with stirrer, thermometer, condenser and provided with a nitrogen atmosphere was placed 215 parts of toluene, 54.6 parts of a mixture of primary aliphatic alcohols having the following composition:

| | Weight percent |
|---|---|
| $C_{20}$ alcohol | 16 |
| $C_{22}$ alcohol | 15 |
| $C_{24}$ alcohol | 12 |
| $C_{26}$ alcohol | 10 |
| $C_{28}$ alcohol | 6 |
| $C_{32}$ alcohol | 1 |
| $C_{20-50}$ paraffinic hydrocarbon | 35 |

Following this, 6.64 parts of phosphorus pentasulfide was added. This mixture was stirred and refluxed for 2.5 hours. It was then cooled to 70° C. and 5 parts of sodium bicarbonate added. Following this, 29 parts of the toluene solution prepared in step A was added over a 20 minute period while maintaining the reaction mixture at reflux. Following this, 45 parts of toluene were added and the mixture refluxed for 30 minutes. It was cooled to room temperature and 60 parts of water added. Additional sodium carbonate was supplied to render the mixture alkaline following which the mixture was filtered. The toluene and other volatiles were then distilled out under vacuum, leaving 59.2 parts of a wax-like solid. This was identified by infrared to consist essentially of S-[3,5-di-($\alpha$ - methylbenzyl - 4 - hydroxybenzyl - O,O-di-($C_{20-50}$ primary alkyl) phosphorodithioate and a small amount of 2,4,6 - tri($\alpha$-methylbenzyl)phenol and O,O-di-($C_{20-50}$ primary alkyl) phosphorodithioate, S,S-diester with $\alpha^2,\alpha^4$-dimercapto-6-($\alpha$-methylbenzyl)-2,4-xylenol.

EXAMPLE 2

The above example is repeated using purified 2,6-di-($\alpha$-methylbenzyl)phenol instead of the mixture employed in Example 1. The product is S-[3,5-di($\alpha$-methylbenzyl)-4 - hydroxybenzyl] - O,O-di-($C_{20-50}$ primary alkyl) phosphorodithioate.

EXAMPLE 3

In the reaction vessel of Example 1 is placed one mole part of O,O-di(p-nonylphenyl)dithiophosphoric acid and 1000 parts of toluene. To this is added a solution of one mole part of 3,5-di($\alpha$-methylbenzyl)-4-hydroxybenzyl chloride in 500 parts of xylene. The mixture is refluxed for 10 hours until hydrogen chloride evolution stops. It is then cooled to room temperature, washed with water, and the xylene distilled out, leaving S-[3,5-di($\alpha$-methylbenzyl) - 4-hydroxybenzyl]-O,O-di(p-nonylphenyl phosphorodithioate.

EXAMPLE 4

The above example is repeated except that one mole part of potassium carbonate is added to the xylene solution of the O,O-di(p-nonylphenyl)dithiophosphoric acid prior to adding the 3,5-di($\alpha$-methylbenzyl)-4-hydroxybenzyl chloride. The reaction is complete within 30 minutes, giving the same product in high yield and good purity.

EXAMPLE 5

To the reaction vessel of Example 1 is added one part of O,O-dimethyl dithiophosphoric acid and 500 parts of tetrachloroethane. One mole part of dry sodium bicarbonate powder is slurried into the mixture and then one mole part of 3,5-di($\alpha$-methylbenzyl)-4-hydroxybenzyl chloride is added. The mixture is stirred for one hour at 75–80° C., following which it is cooled to room temperature and washed with water. It is then filtered and the solvent distilled out, leaving S-[3,5-di($\alpha$-methylbenzyl)-4-hydroxybenzyl]-O,O-dimethyl phosphorodithioate.

Other O,O-diesters of dithiophosphoric acid can be used in the above example to yield other additives of this invention. For example, O,O-diisopropyl ester yields S - [3,5 - di($\alpha$-methylbenzyl)-4-hydroxybenzyl]-O,O-diisopropyl phosphorodithioate. Di-n-butyl ester forms S - [3,5 - di($\alpha$-methylbenzyl)-4-hydroxybenzyl]-O,O-di-n-butyl phosphorodithioate. Likewise, di-n-dodecyl ester yields S - [3,5 - di($\alpha$-methylbenzyl)-4-hydroxybenzyl]-O,O-di-n-dodecyl phosphorodithioate. In like manner, di-sec.-dodecyl ester froms S-[3,5-di($\alpha$-methylbenzyl)-4-hydroxybenzyl] - O,O - di-sec-dodecyl phosphorodithioate. Similarly, di-sec-eicosyl ester will give S-[3,5-di($\alpha$-methylbenzyl) - 4 - hydroxybenzyl] - O,O-di-sec-eicosyl phosphorodithioate. Di-primary triacontyl ester forms S - [3,5 - di($\alpha$ - methylbenzyl)-4-hydroxybenzyl]-O,O-di-primary triaconyl phosphorodithioate. Similarly, dipentacontyl ester will form S-[3,5-di($\alpha$-methylbenzyl)-4-hydroxybenzyl] - O,O - dipentacontyl phosphorodithioate. Aromatic esters can be employed with equally good results. For example, the O,O-diphenyl ester of dithiophosphoric acid will yield S-[3,5-di($\alpha$-methylbenzyl)-4-hydroxybenzyl]-O,O-diphenyl phosphorodithioate. Also, the O,O-p-tetradecylphenyl ester forms S-[3,5-di($\alpha$-methylbenzyl) - 4 - hydroxybenzyl]-O,O-di(p-tetradecylphenyl) phosphorodithioate. The O,O-di-$\alpha$-naphthyl ester forms S - [3,5 - di($\alpha$ - methylbenzyl)-4-hydroxybenzyl]-O,O-di($\alpha$-naphthyl) phosphorodithioate. In like manner, the O,O-dicyclohexyl ester of dithiophosphoric acid yields S - 3,5 - di($\alpha$ - methylbenzyl) - 4-hydroxybenzyl]-O,O-dicyclohexyl phosphorodithioate. Likewise, the O,O-di-(4-tetradecyclohexyl) ester forms S-[3,5-di($\alpha$-methylbenzyl)-4 - hydroxybenzyl] - O,O - di(4-tetradecyclohexyl) phosphorodithioate.

EXAMPLE 6

In the reaction vessel of Example 1 place one mole part of O,O-di($C_{20-50}$ primary alkyl) dithiophosphoric acid made as shown in Example 1. To this, add 1500 parts of toluene and one mole part of sodium bicarbonate. Over a period of 30 minutes, while stirring at 175° C., add a solution of one mole part of 3-tert-butyl-5-($\alpha$-methylbenzyl)-4-hydroxybenzyl bromide in 500 parts of toluene. Heat to reflux and reflux for 30 minutes. Cool and wash with water. Filter and then distill out the solvent under vacuum, leaving as the product S-[3-tert-butyl - 5 - ($\alpha$-methylbenzyl)-4-hydroxybenzyl]-O,O-di-($C_{20-50}$ primary alkyl) phosphorodithioate.

Other alkali metal bases such as potassium hydroxide sodium oxide, sodium hydroxide, sodium carbonate, potassium bicarbonate, potassium carbonate, and the like, can be employed in the above example with good results.

Likewise, other $\alpha$-alkylbenzyl-substituted benzyl halides can be used. For instance, 3-methyl-5- $\alpha,\alpha$-dimethylbenzyl)-4-hydroxybenzyl chloride yields S-[3-methyl-5-($\alpha,\alpha$-dimethylbenzyl)-4 - hydroxybenzyl]-O,O-di($C_{20-50}$ primary alkyl) phosphorodithioate. Similarly, 3-sec-eicosyl-5-($\alpha$-n-propylbenzyl)-4-hydroxybenzyl chloride will yield S-[3-sec-eicosyl-5-($\alpha$-n-propylbenzyl)-4 - hydroxybenzyl]-O,O-di($C_{20-50}$ primary alkyl) phosphorodithioate. In like manner, 3 - cyclohexyl-5-($\alpha,\alpha$-di-n-propylbenzyl)-4-hydroxybenzyl chloride yields S-[3-cyclohexyl-5-($\alpha,\alpha$-di-n-propylbenzyl)-4 - hydroxybenzyl]-O,O-di($C_{20-50}$ primary alkyl) phosphorodithioate. Likewise, 3-(4-tetradecylcyclohexyl)-5-($\alpha$-methyl-4-sec-dodecylbenzyl) - 4 - hydroxybenzyl bromide leads to S-[3-(4-tetradecylcyclohexyl)-5-($\alpha$-methyl-4-sec-dodecylbenzyl) - 4 - hydroxybenzyl]-O,O-di($C_{20-50}$ primary alkyl) phosphorodithioate.

EXAMPLE 7

In the reaction vessel of Example 1 is placed 2 mole parts of O,O-di-n-dodecyl dithiophosphoric and 750 parts of xylene. To this is added 1.5 mole part of sodium carbonate, following which the mixture is heated to 75° C. while stirring. A solution of one mole part of 6-($\alpha$-methylbenzyl)-2,4-dichloromethylphenol in 500 parts of xylene is added at 75–80° C. over a one hour period. This mixture is then refluxed one hour and then cooled to room temperature and filtered. The filtrate is washed with water and the xylene distilled out under vacuum, leaving as the product O,O-dialkyl pnosphorodithioate, S,S-diester with $\alpha^2,\alpha^4$-dimercapto-6-($\alpha$-methylbenzyl-2,4-xylenol.

Other similar stabilizers of this invention can be made following the above general procedure, but using different O,O-diesters of dithiophosphoric acid. For example, O,O-dimethyldithiophosphoric acid yields the O,O-dimethyl phosphorodithioate S,S-diester, as shown above. Likewise, O,O-dieicosyl dithiophosphoric acid yields the O,O-dieicosyl phosphorodithioate S,S-diester. Similarly O,O-dipentacontyl dithiophosphoric acid forms O,O-di-pentacontyl phosphorodithioate S,S-diester. Likewise, O,O-di($C_{20-50}$ primary alkyl) dithiophosphoric acid forms the corresponding O,O-di($C_{20-50}$ primary alkyl) phosphorodithioate S.S-diester. In like manner, O,O-diphenyl dithiophosphoric acid forms O,O-diphenyl phosphorodithioate, S,S-diester with $\alpha^2,\alpha^4$-dimercapto - 6 - ($\alpha$-methylbenzyl)-2,4-xylenol, following the procedure of Example 7. Also, O, O-di(p-nonylphenyl)dithiophosphoric acid yields O,O-di (p-nonylphenyl)phosphorodithioate S,S-diester, as above.

Similarly, substitution of different halomethylphenols will lead to other stabilizers of this invention following the general procedure of Example 7. The use of 6-($\alpha,\alpha$-dimethyl)-2,4 - dichloromethylphenol yields O,O-di-n-dodecyl phosphorodithioate S,S-diester with $\alpha^2,\alpha^4$-dimercapto-6-($\alpha,\alpha$-dimethylbenzyl)-2,4-xylenol. Likewise, 6 - ($\alpha$-n-propylbenzyl)-2,4-dichloromethylphenol yields O,O-di-n-dodecyl phosphorodithioate S,S-diester witn $\alpha^2,\alpha^4$-dimercapto-6-($\alpha$-n-propylbenzyl)-2,4-xylenol. The use of 6-($\alpha,\alpha$-di-n-propylbenzyl)-2,4-dibromomethylphenol leads to O, O-di-n-dodecyl phosphorodithioate S,S-diester with $\alpha^2,\alpha^4$-di-mercapto-6-($\alpha,\alpha$-di-n-propylbenzyl)-2,4-xylenol. Similarly, 6-($\alpha$-methyl-2,3-benzobenzyl)-2,4-di-iotomethylphenol leads to O,O-di-n-dodecyl phosphorodithioate S,S-diester with $\alpha^2,\alpha^4$-di-mercapto-6-($\alpha$-methyl-2,3-benzobenzyl)-2,4-xylenol.

The additives described herein are eminently useful as stabilizers and antioxidants for SBR rubber compositions. The amount of additives used in the rubber composition is not critical as long as an amount sufficient to provide the desired protection is present. This amount varies from as little as 0.001 weight percent up to about 5 weight percent. Generally, excellent results are obtained when from about 0.1 to about 3 weight percent of the additive, based on the weight of the SBR rubber, is included in the composition.

The following examples serve to illustrate the use of the stabilizers of the present invention in stabilizing both unvulcanized and vulcanized SBR rubber.

EXAMPLE 8

A styrene-butadiene copolymer containing 30 percent styrene units and 70 percent butadiene units is prepared in an aqueous emulsion using sodium oleate as an emulsifying agent and potassium persulfate/lauryl mercaptan as the polymerization catalyst. The final emulsion contains 20 weight percent solids. To this is added a sodium oleate stabilized aqueous emulsion of S-(3,5-di-tert-butyl-4-hydroxybenzyl)-O,O-di($C_{20-50}$ primary alkyl) phosphorodithioate. The emulsion made by adding a toluene solution of the phosphorodithioate to water containing a sodium oleate emulsifying agent. The amount of phosphorodithioate in the emulsion is equal to one weight percent of the styrene-butadiene copolymer solids. The final emulsion is then vigorously stirred, following which it is added to an aqueous solution containing 3.5 weight percent sodium chloride and 0.25 weight percent sulfuric acid, causing the unvulcanized styrene-butadiene rubber to coagulate in the form of crumb containing one weight percent of S-(3,5-di-tert-butyl - 4 - hydroxybenzyl)-O,O-di($C_{20-50}$ primary alkyl) phosphorodithioate. This SBR crumb is extremely resistant to change in its Mooney viscosity during the storage period prior to final compounding and vulcanization.

EXAMPLE 9

An SBR master batch is prepared by compounding in a Banbury blender the following ingredients:

|  | Parts |
|---|---|
| Unvulcanized SBR rubber | 100 |
| Zinc propionate-stearate | 5 |
| Carbon black | 50 |
| Sulfur | 2 |
| Mercaptobenzothiazole | 1.5 |
| S-[3,5-di($\alpha$-methylbenzyl) - 4 - hydroxybenzyl]-O,O-di-($C_{20-50}$ primary alkyl)-phosphorodithioate | 1 |

After thorough blending the compounded rubber is placed in a mold and cured for 60 minutes at 274° F., resulting in a vulcanized rubber of increased resistance to oxidative degradation.

Any of the previously-listed additives of this invention can be used in the above formulations with good results. Likewise, they can also be successfully used in other SBR formulations well known in the rubber art.

The additives described herein are especially useful for stabilizing unvulcanized styrene-butadiene rubber (SBR rubber) against change in Mooney viscosity during the storage period between initial manufacture and final compounding and vulcanization. While in this unvulcanized state, the SBR rubber is extremely susceptible to degradation by chain scission and cross-linking. This is apparently due to the high degree of unsaturation present in unvulcanized SBR rubber. This unsaturation is eliminated in the vulcanization process so that the problem of protecting vulcanized SBR rubber against oxidative degradation is entirely different from the problem of stabilizing unvulcanized SBR rubber. Many additives that are effective antioxidants for vulcanized SBR rubber have little or no effect in stabilizing unvulcanized SBR rubber. Without proper stabilization, unvulcanized SBR rubber can suffer drastic changes in Mooney viscosity, leading to either semi-liquefaction or embrittlement during the storage period. Frequently both phenomena occur; the rubber first tending to liquefy and then embrittle. Neither of these situations can be tolerated by the rubber industry. The unvulcanized SBR rubber stock must be maintained at a uniform viscosity so that it can be readily compounded with the other ingredients that are finally incorporated into finished rubber and produce a satisfactory vulcanized rubber stock. It is not possible to properly compound and vulcanize SBR rubber that has suffered a catastrophic change in its Mooney viscosity.

In order to demonstrate the exceptional resistance to change in unvulcanized SBR rubber imparted by the additives of this invention, tests were carried out in which the change in Mooney viscosity of unvulcanized SBR rubber was determined during an accelerated aging test. In carrying out these tests, unvulcanized SBR rubber samples were prepared by dissolving 1.2 parts of the test stabilizer in about 9 parts of toluene and emulsifying this solution in about 50 parts of water containing an emulsifying agent (Daxad 11). This emulsion was then added to 120 parts of SBR rubber latex (20 percent solids). The latex was stirred until the stabilizer was thoroughly dispersed and then was fed into an aqueous coagulating solution containing 3.5 percent sodium chloride and 0.25 percent sulfuric acid. The "popcorn" crumb which formed was filtered off and washed with hot water. It was placed in an Aging Oven maintained at 76° C. and samples were taken at the end of 5 and 10 days of aging. The samples were promptly milled into ½" thick rubber sheets and their Mooney viscosity determined. The following table shows the change in Mooney viscosity of an unvulcanized SBR rubber stabilized with an additive of this invention compared to the same SBR rubber containing equal amounts of other materials which have been used as rubber antioxidants.

| Additive | Mooney viscosity | | | |
|---|---|---|---|---|
|  | Initial | 5 days | 10 days | 14 days |
| 1. Tris(p-nonylphenyl)phosphite | 48 | 44 | 50 | Resin |
| 2. Phenyl-$\beta$-naphthyl amine (PBNA) | 48 | 50 | 49 | 45 |
| 3. S-[3,5-di($\alpha$-methylbenzyl)-4- hydroxybenzyl]-O,O-di($C_{20-50}$ primary alkyl) phosphorodithioate (from Example 1) | 47 | 46 | | 40 |

The unvulcanized SBR rubber containing the stabilizers described herein not only maintained a substantially constant Mooney viscosity during the test but they also exhibited only slight change in color. This is a highly desirable quality in a rubber stabilizer. The term of the test represents many months of normal storage conditions. The tris(p-nonylphenyl)phosphite, although used commercially as an antioxidant for vulcanized rubber, offered poor protection against change in Mooney viscosity of the unvulcanized SBR rubber, as evidenced by the increase in Mooney viscosity at the 10 day period and resinification at 14 days. This shows that the raw SBR is suffering cross-linking. The PBNA, another commercial rubber antioxidant, offered protection, but caused the rubber to turn dark brown during aging—a condition that is unacceptable in rubber used in many applications.

Another surprising feature of the present stabilizers is their resistance to discoloration under the influence of ultraviolet light. This property appears to be due to the unique $\alpha$-alkylbenzyl type substitution on the phenolic part of the molecule because other similar compounds that do not contain this substitution will discolor under ultraviolet light. In order to demonstrate this property, further tests were conducted. In these tests, the SBR rubber samples were prepared in the same manner as the "popcorn" crumb used in the Mooney viscosity test. The crumb was dried and then placed on a rotating turntable 10 inches under an RS ultraviolet light. After 24 hours of exposure the samples were examined and the following results were observed.

Additive: Color
S-(5-di-tert-buty - 4 - hydroxybenzyl)-O,O-di($C_{10-12}$ primary alkyl)phosphorodithioate _____ Light yellow.
S - [3,5 - di($\alpha$ - methylbenzyl)-4-hydroxybenzyl]-O,O-di($C_{20-50}$ primary alkyl) phosphorodithioate _____ White.

Thus, the additives of this invention are not only excellent stabilizers for unvulcanized SBR rubber, but they have the added property of being non-discoloring under ultraviolet light.

What is claimed is:
1. A styrene-butadiene rubber containing a stabilizing amount of a stabilizer having the formula:

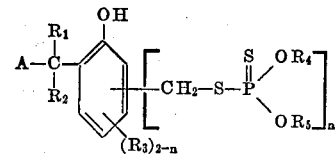

wherein A is an aryl radical containing from 6–18 carbon atoms, $R_1$ is a lower alkyl radical containing from 1–3 carbon atoms, $R_2$ is selected from hydrogen and lower alkyl radicals containing from 1–3 carbon atoms, $R_3$ is selected from the group consisting of alkyl radicals containing from 1–20 carbon atoms, cycloalkyl radicals containing from 6–20 carbon atoms and radicals having the formula:

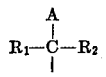

wherein A, $R_1$ and $R_2$ are the same as above; $R_4$ and $R_5$ are independently selected from the group consisting of alkyl radicals containing from 1–50 carbon atoms and aryl radicals containing from 6–20 carbon atoms, and $n$ is 1 or 2.

2. A composition of claim 1 wherein said stabilizer is a compound having the formula:

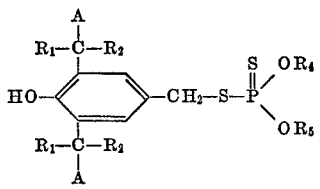

wherein A is an aryl radical containing from 6–18 carbon atoms, $R_1$ is a lower alkyl radical containing from 1–3 carbon atoms, $R_2$ is selected from hydrogen and lower alkyl radicals containing from 1–3 carbon atoms, and $R_4$ and $R_5$ are independently selected from the group consisting of alkyl radicals containing from 1–50 carbon atoms and aryl radicals containing from 6–20 carbon atoms.

3. An unvulcanized styrene-butadiene rubber of claim 1 normally subject to change in Mooney viscosity during the storage period between copolymerization and final compounding and vulcanization stabilized against said change in Mooney viscosity by the addition thereto of from about 0.01 to 3 weight percent of said stabilizer.

4. The composition of claim 3 wherein said stabilizer is a compound having the formula:

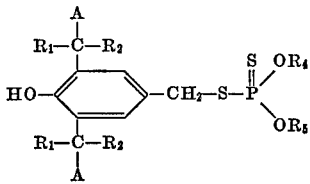

wherein A is an aryl radical containing from 6–18 carbon atoms, $R_1$ is a lower alkyl radical containing from 1–3 carbon atoms, $R_2$ is selected from hydrogen and lower alkyl radicals containing from 1–3 carbon atoms, and $R_4$ and $R_5$ are independently selected from the group consisting of alkyl radicals containing from 1–50 carbon atoms and aryl radicals containing from 6–20 carbon atoms.

5. The composition of claim 4 wherein said stabilizer is a compound having the formula:

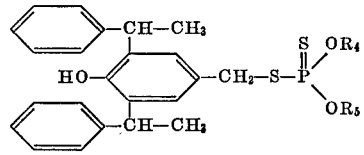

wherein $R_4$ and $R_5$ are the same as in claim 4.

6. The composition of claim 5 wherein said stabilizer is a compound having the formula:

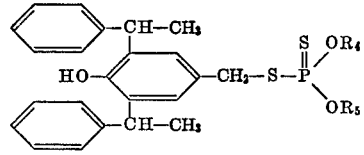

wherein $R_4$ and $R_5$ are primary aliphatic hydrocarbon radicals containing from about 20 to about 50 carbon atoms.

7. The composition of claim 6 wherein $R_4$ and $R_5$ are primary aliphatic hydrocarbon radicals containing from about 20 to about 50 carbon atoms in the proportion of from about 14–19 weight percent primary aliphatic radicals containing 20 carbon atoms, about 14–29 weight percent primary aliphatic radicals containing 22 carbon atoms, about 7–21 weight percent primary aliphatic radicals containing 24 carbon atoms, about 7–21 weight percent primary aliphatic radicals containing 26 carbon atoms, about 7–21 weight percent primary aliphatic radicals containing 28 carbon atoms, and about 7–21 weight percent primary aliphatic radicals of even carbon number containing from 30–50 carbon atoms.

References Cited
UNITED STATES PATENTS

| | | | |
|---|---|---|---|
| 2,530,339 | 11/1950 | Mikeska et al. | 260—930 |
| 2,552,570 | 5/1951 | McNab et al. | 260—45.7 |
| 3,060,121 | 10/1962 | Orloft et al. | 260—45.95 |
| 3,061,586 | 10/1962 | Thompson | 260—45.95 |

DONALD E. CZAJA, Primary Examiner

V. P. HOKE, Assistant Examiner

UNITED STATES PATENT OFFICE
CERTIFICATE OF CORRECTION

Patent No. 3,801,543          Dated   April 2, 1974

Inventor(s)   Bernard R. Meltsner

It is certified that error appears in the above-identified patent and that said Letters Patent are hereby corrected as shown below:

Column 2, line 22, "for styrene-butadiene rubber. A further object is to pro-" should read -- for unvulcanized styrene-butadiene copolymers. The pres- --; in Formula I, that part of the formula reading:

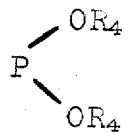     should read     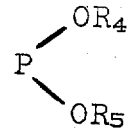

Column 12, line 56, "S-(5-di-tert-buty" should read -- S-(3,5-di-tert-butyl -- . Column 14, in Claim 7, at line 31, "14-19" should read -- 14-29 -- .

Signed and sealed this 10th day of September 1974.

(SEAL)
Attest:

McCOY M. GIBSON, JR.                    C. MARSHALL DANN
Attesting Officer                       Commissioner of Patents